United States Patent
Starobinets et al.

(10) Patent No.: US 12,512,226 B2
(45) Date of Patent: Dec. 30, 2025

(54) EFFECTIVE IMAGING EXAMINATION HANDOFFS BETWEEN USERS WITHIN A RADIOLOGY OPERATIONS COMMAND CENTER (ROCC) STRUCTURE

(71) Applicant: KONINKLIJKE PHILIPS N.V., Eindhoven (NL)

(72) Inventors: Olga Starobinets, Newton, MA (US); Sandeep Madhukar Dalal, Winchester, MA (US); Ranjith Naveen Tellis, Tewksbury, MA (US); Yuechen Qian, Lexington, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 322 days.

(21) Appl. No.: 17/685,458

(22) Filed: Mar. 3, 2022

(65) Prior Publication Data
US 2022/0319721 A1    Oct. 6, 2022

Related U.S. Application Data

(60) Provisional application No. 63/168,347, filed on Mar. 31, 2021.

(51) Int. Cl.
*G16H 80/00* (2018.01)
*G16H 30/20* (2018.01)
*G16H 40/67* (2018.01)

(52) U.S. Cl.
CPC ............ *G16H 80/00* (2018.01); *G16H 30/20* (2018.01); *G16H 40/67* (2018.01)

(58) Field of Classification Search
CPC ......... G16H 80/00; G16H 30/20; G16H 40/67
USPC ............................................................ 705/2
See application file for complete search history.

(56) References Cited

U.S. PATENT DOCUMENTS

| | | | |
|---|---|---|---|
| 10,148,707 B2 * | 12/2018 | Gupta | ............... H04L 12/1822 |
| 10,430,549 B2 | 10/2019 | Backhaus | |
| 10,430,550 B2 | 10/2019 | Backhaus | |
| 11,272,054 B1 * | 3/2022 | Gerrard | ................... G10L 15/02 |
| 2002/0004798 A1 * | 1/2002 | Babula | .................. G16H 40/40 |

(Continued)

OTHER PUBLICATIONS

Streitenberger, et al: "Handoffs in Cared Can We Make Them Safer?", Pediatr Clin North Am. Dec. 2006;53(6):1185-95.

(Continued)

*Primary Examiner* — Jason S Tiedeman
*Assistant Examiner* — Sara Jessica Morice De Vargas

(57) ABSTRACT

A non-transitory computer readable medium (26s) stores instructions executable by at least one electronic processor (14s) to perform a remote assistance method (100). The method includes: providing a remote assistance interface (28, 28') via which a local operator (LO) can receive remote assistance during a medical imaging examination performed by the local operator using a medical imaging device (2); prior to or during the medical imaging examination, identifying a handoff (40) from a first remote expert (RE) assigned to provide the remote assistance during the medical imaging examination to a second remote expert (SRE); generating a representation (46) containing information about the medical imaging examination; transferring the representation containing information about the medical imaging examination to the second remote expert; and reassigning the medical imaging examination from the first remote expert to the second remote expert.

17 Claims, 3 Drawing Sheets

(56) References Cited

U.S. PATENT DOCUMENTS

| | | | |
|---|---|---|---|
| 2003/0031992 A1* | 2/2003 | Laferriere | H04L 67/131 |
| | | | 434/262 |
| 2009/0067611 A1* | 3/2009 | Barnett | H04M 3/5237 |
| | | | 379/265.03 |
| 2011/0218822 A1* | 9/2011 | Buisman | G16H 15/00 |
| | | | 705/2 |
| 2016/0004836 A1 | 1/2016 | Rybkin | |
| 2016/0063619 A1* | 3/2016 | Smith | G06Q 20/40 |
| | | | 705/44 |
| 2016/0182715 A1* | 6/2016 | Rist | H04M 7/0021 |
| | | | 379/211.02 |
| 2018/0020918 A1* | 1/2018 | Redei | G16H 40/67 |
| | | | 600/300 |
| 2018/0137943 A1 | 5/2018 | Webb | |
| 2020/0185088 A1 | 6/2020 | Kaliraman | |
| 2021/0093285 A1* | 4/2021 | Hader | G16H 80/00 |
| 2022/0104910 A1* | 4/2022 | Shelton, IV | A61B 90/37 |

OTHER PUBLICATIONS

Ronda Collins: "Hand-off communication: The weak link in healthcare", Dec. 7, 2017 https://www.beckershospitalreview.com/hospital-management-administration/hand-off-communication-the-weak-link-in-healthcare.html.

* cited by examiner

EFFECTIVE IMAGING EXAMINATION HANDOFFS BETWEEN USERS WITHIN A RADIOLOGY OPERATIONS COMMAND CENTER (ROCC) STRUCTURE

CROSS REFERENCE TO RELATED APPLICATIONS

This application claims the benefit of U.S. Provisional Patent Application No. 63/168,347 filed Mar. 31, 2021. This application is hereby incorporated by reference herein.

The following relates generally to the imaging arts, remote imaging assistance arts, remote imaging examination monitoring arts, imaging examination handoff arts, and related arts.

BACKGROUND

The demand for high quality medical imaging by techniques such as magnetic resonance imaging (MRI), transmission computed tomography (CT), positron emission tomography (PET), and other medical imaging modalities is high, and is expected to increase with an aging population in many countries and other factors such as improved imaging system capabilities and improved techniques for generating actionable clinical findings from medical images. The increasing problem of getting highly qualified staff (sometimes referred to as imaging technicians or technologists) for performing complex medical imaging examinations has driven the concept of bundling medical expertise in remote service centers. The basic idea is to provide virtual availability of Senior Technologists as on-call remote experts in case a (local, on-site) technologist or operator performing a medical imaging examination needs assistance with a scheduled examination or runs into unexpected difficulties. In either case, the remote expert remotely assists the on-site operator by receiving real-time views of the situation by way of screen mirroring of the display of the medical imaging device controller and optionally other information feeds such as one or more video feeds of the imaging bay. The remote expert typically does not directly operate the medical imaging device, but provides advice or other input for assisting the local technologist by way of telephonic or videoconferencing communication.

The following discloses certain improvements.

SUMMARY

In one aspect, a non-transitory computer readable medium stores instructions executable by at least one electronic processor to perform a remote assistance method. The method includes: providing a remote assistance interface via which a local operator can receive remote assistance during a medical imaging examination performed by the local operator using a medical imaging device; prior to or during the medical imaging examination, identifying a handoff from a first remote expert assigned to provide the remote assistance during the medical imaging examination to a second remote expert; generating a representation containing information about the medical imaging examination; transferring the representation containing information about the medical imaging examination to the second remote expert; and reassigning the medical imaging examination from the first remote expert to the second remote expert.

In another aspect, a non-transitory computer readable medium stores instructions executable by at least one electronic processor to perform a remote assistance method. The method includes: providing a remote assistance interface via which a local operator can receive remote assistance during a medical imaging examination performed by the local operator using a medical imaging device; prior to or during the medical imaging examination, identifying a handoff from a first remote expert assigned to provide the remote assistance during the medical imaging examination to a second remote expert; generating a representation containing information about the medical imaging examination by retrieving the information about the medical imaging examination from at least one data source.

In another aspect, a remote assistance method include: providing a remote assistance interface via which a local operator can receive remote assistance during a medical imaging examination performed by the local operator using a medical imaging device; prior to or during the medical imaging examination, identifying a handoff from a first remote expert assigned to provide the remote assistance during the medical imaging examination to a second remote expert; generating a representation containing information about the medical imaging examination by retrieving the information about the medical imaging examination from at least one data source, the representation including at least an imaging protocol, one or more patient complications, one or more sources of image artifacts, hardware issues of the imaging device, and suggestions on how to proceed during the examination; transferring the representation containing information about the medical imaging examination to the second remote expert; and reassigning the medical imaging examination from the first remote expert to the second remote expert.

One advantage resides in providing a remote expert or radiologist assisting a technician in conducting a medical imaging examination with situational awareness of local imaging examination(s) which facilitates providing effective assistance to one or more local operators at different facilities.

Another advantage resides in providing effective handoffs of medical imaging examinations from one remote expert to another to provide continuous support for a local operator performing the medical imaging examination.

Another advantage resides in generating a summary card containing information about a medical imaging examination during a handoff of the examination from one remote expert to another.

Another advantage resides in providing a list of available remote experts for a remote expert currently assisting a local operator during a medical imaging examination to handoff the examination to another remote expert on the list.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The disclosure may take form in various components and arrangements of components, and in various steps and arrangements of steps. The drawings are only for purposes of illustrating the preferred embodiments and are not to be construed as limiting the disclosure.

DETAILED DESCRIPTION

Figure 1:
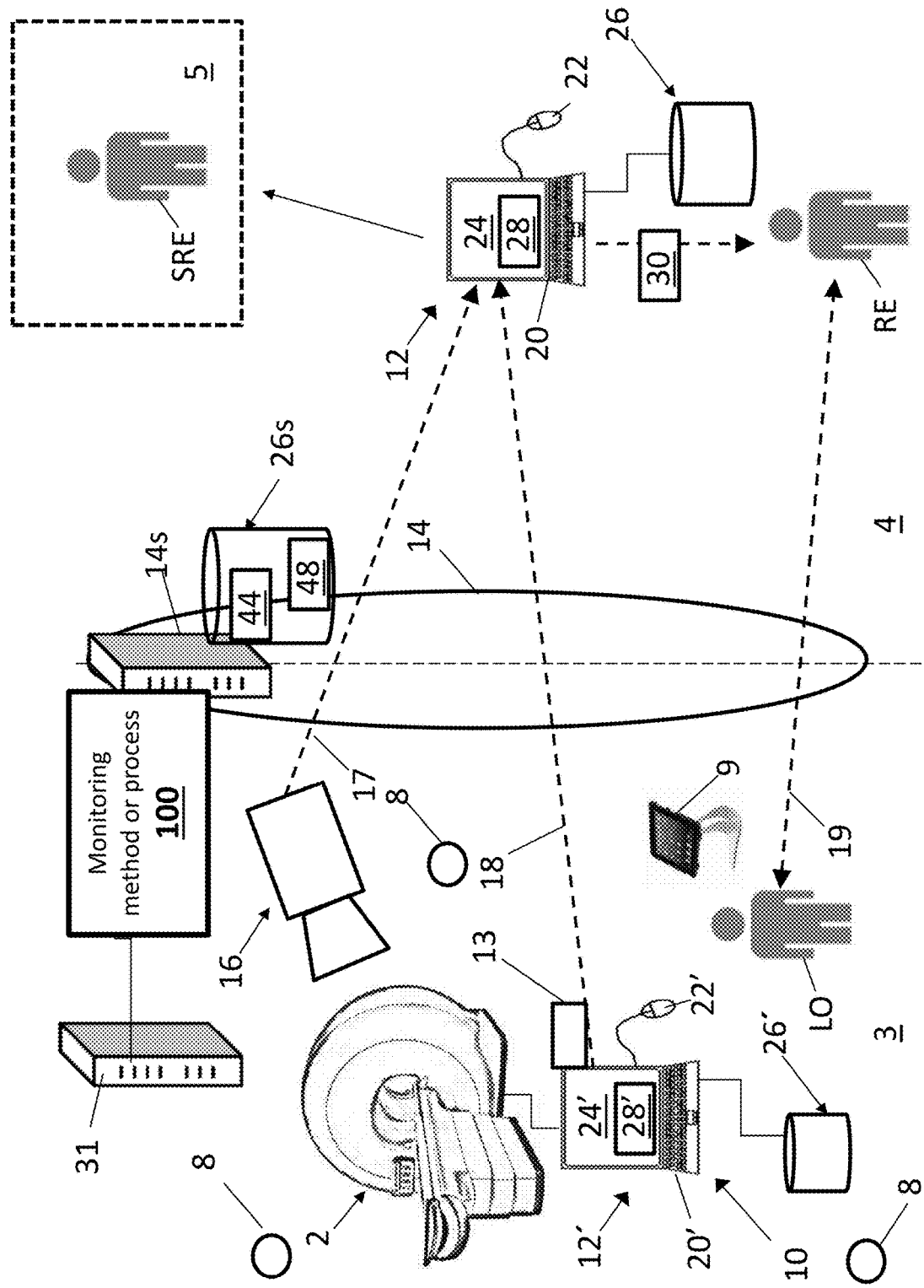
FIG. 1 diagrammatically shows an illustrative apparatus for providing remote assistance in accordance with the present disclosure.

To make a remote service center commercially viable, it would be advantageous to enable the remote expert to concurrently assist (or be on call to assist) a number of different local technologists performing possibly concurrent medical imaging examinations. The local technologists may be located in a single hospital, or may be distributed among several hospitals in the same geographic area (e.g., a single city) or across a larger geographical area (e.g., spread across several states or even different countries). Preferably, the remote service center would be able to connect the expert to imaging systems of different models and/or manufactured by different vendors, since many hospitals maintain a heterogeneous fleet of imaging systems. This can be achieved by screen sharing or screen mirroring technologies that provide the remote expert a real-time copy of the imaging device controller display, optionally along with video cameras to provide views of the imaging bay and, optionally, the interior of the bore or other examination region of the imaging device. Such scalability can enable many local operators to benefit from the assistance of a single highly qualified remote expert (or small group of highly qualified remote experts) in a cost-effective manner.

In order for such remote services to be successful in supporting high quality imaging operations, continuity of patient care has to be preserved in the event that an examination is handed off from one remote expert to another remote expert. A handoff can occur by a volitional decision, or in response to a loss of communication connectivity. A handoff in the medical arts is traditionally seen as a transfer of responsibility for patient care along with pertinent patient information from one clinician to another during transitions of care (e.g., hospital shifts). Discontinuity in patient care creates opportunities for errors—this is true in "real-life" settings and remains true for virtualized healthcare operations. In a radiology department, communication failures could lead to poor exam quality, longer exams (disrupting workflow), repeated scans, and overall dissatisfaction for patients, radiologists, fellow technologists, etc. During handoffs any patient needs, study requirements, scanner issues, image quality concerns should be clearly articulated and quickly transmitted. During an effective handoff all the necessary information required for patient care gets transferred.

Handoffs have traditionally been a sore spot for traditional hospital operations. Poor handoffs can result in errors and may have a significant detrimental effect on patient care. It is recognized herein that in the case of a remote assistance system, poorly managed handoffs between remote experts can also be a potential source of detrimental errors.

The following relates to a remote assistance system for assisting local imaging technicians in performing medical imaging examinations. Such a remote assistance system is sometimes referred to as a Radiology Operations Command Center (ROCC), and provides remote "supertech" assistance to a local technician performing an imaging examination. The ROCC may for example provide vendor- and model-agnostic screen sharing of the imaging device console with the remote expert (i.e., the "supertech"), along with video-conferencing capability. Other information feeds to the remote expert may also be provided, such as a bay camera for providing the remote expert with a view of the imaging bay preferably capturing the patient loading/unloading area and/or other critical area(s).

The ROCC provides an infrastructure via which remote experts can be on-call to assist local imaging technicians during difficult portions of imaging examinations. For maximum efficiency, each remote expert on staff at any given time may be assigned to be on call for several imaging examinations in progress at the same time since any given imaging examination is unlikely to need remote expert assistance.

However, this approach of assigning multiple concurrently occurring examinations to a remote expert can lead to situations in which a given remote expert may need to transfer an examination to another remote expert, for example due to the remote expert becoming overloaded if two or more local technicians assigned to the same expert require assistance at the same time. This handoff of an imaging examination from one expert to another is non-trivial. To seamlessly provide support, the receiving remote expert should be quickly brought up to date on the current status of the imaging examination, along with relevant information that might impact the advice provided by the receiving remote expert. The present disclosure provides various approaches for ensuring seamless handoffs between remote experts.

In various aspects disclosed herein, the remote expert is provided with a mechanism for initiating a handoff. For example, the graphical user interface (GUI) used by the expert in assisting the local technician can include a "pass the exam" button or the like. When selected, the ROCC brings up a list of other on-call remote experts who are available to receive the handoff. In some examples, a remote expert may be asked to enter the reason for the handoff. For example, if the remote expert is overextended with simultaneous examinations, any available remote expert might be selected; however, if the original remote expert does not have the expertise to support the local operator, then a more selective process can be used to identify a more appropriate recipient (for instance an expert in cardiac imaging, etc.). Upon selection of a possible receiving expert, the selected expert is notified of the handoff request. Preferably, the selected expert is also provided with at least some basic information about the examination being handed off. The selected expert can then accept or decline the handoff.

If the selected expert accepts the handoff, then the ROCC generates a summary card containing salient information about the examination, preferably presented in a standardized format. This information may include, for example: imaging protocol in use; patient complications; sources of image artifacts (e.g., implants); hardware issues that may be extant in the imaging device being used; and suggestions on how to proceed.

The information contained in the summary card may be obtained from various sources, such as a pre-examination screening, information mined from the imaging device controller display (for ROCC with controller screen sharing), and transcripts of communications between the local technician and the remote expert (where the exam is handed off during a remote expert assistance session). The pre-examination screening can typically be an electronic questionnaire that is completed by the patient and/or a nurse and is therefore available in electronic format in the Radiology Information System (RIS) or Electronic Patient Record (EPR). In one nonlimiting illustrative example, the screening indicates the patient has a borderline estimated glomerular filtration rate (eGFR). Administration of a contrast agent to enhance image quality may be contraindicated if the patient has a borderline eGFR, since the borderline eGFR is an indication of poor kidney function and an administered contrast agent imposes a substantial load on the kidneys. Hence, this information is preferably conveyed to the receiving remote expert during a handoff.

Communication transcripts may be in the form of chat box contents or may be generated by speech recognition applied to the audio of a telephonic or video call between the local technician and remote expert, depending on the modality of the communication. In one embodiment, keyword searching, natural language processing (NLP) and/or other analysis is applied to the transcript and to the shared controller screen data (if available) to extract information for the summary card.

Another contemplated source of information for the summary card is information extracted from huddle sessions. It is common practice in some radiology laboratories for radiology staff (e.g., imaging technicians, nurses, radiologists, etc.) to conduct a huddle session in the morning or at work shift changes, where issues such as equipment problems, staff shortages, problem patients on the schedule, and/or other matters are discussed. Presently, remote experts typically do not participate in these huddle sessions since they are not members of the on-site hospital staff. In one approach, the remote expert is brought into the huddle session by way of a telephonic or video connection, and a huddle transcript is thus generated by applying speech recognition to the call and can be mined to obtain salient information. If the remote expert does not participate in the huddle session, then an electronic image of a white board used in the huddle session can be obtained and analyzed by optical character recognition (OCR) to extract the salient information. The information from the huddle session may be provided to all remote experts assigned to provide assistance for that hospital, and/or may be included in the summary cards of examinations of that hospital that are handed off.

As previously mentioned, in some embodiments manual handoffs are initiated by the initially assigned remote expert using the "pass the exam" button or other GUI transfer icon. There can additionally or alternatively be a desirability of handoffs initiated automatically in response to a loss of connectivity between the current remote expert and the local technician. Thus, in some embodiments, a handoff is triggered by a loss of communication between the initially assigned remote expert and the local technician. If the communication loss occurs during an assistance session, and/or is for an extended time period, then the disclosed system can automatically execute a handoff. In this case, the ROCC retrieves the list of available on-call remote experts and automatically selects a possible receiving expert from the list, and sends an automated notification of the handoff request. If the selected expert accepts, then the handoff is performed in the same way as a manual handoff, except that an automated notification is also sent to the initial remote expert advising the initial remote expert that responsibility for the examination has been transferred away.

With reference to FIG. 1, an apparatus for providing assistance from a remote medical imaging expert RE (or supertech) to a local technician operator LO is shown. As shown in FIG. 1, the local operator LO, who operates one or more medical imaging devices (also referred to as an image acquisition device, imaging device, and so forth) 2, is located in a medical imaging device bay 3, and the remote operator RE is disposed in a remote service location or center 4. It should be noted that the "remote operator" RE may not necessarily directly operate the medical imaging device 2, but rather provides assistance to the local operator LO in the form of advice, guidance, instructions, or the like. The remote location 4 can be a remote service center, a radiologist's office, a radiology department, and so forth. The remote location 4 may be in the same building as the medical imaging device bay 3 (this may, for example, in the case of a "remote operator" RE who is a radiologist tasked with peri-examination image review), but more typically the remote service center 4 and the medical imaging device bay 3 are in different buildings, and indeed may be located in different cities, different countries, and/or different continents. In general, the remote location 4 is remote from the imaging device bay 3 in the sense that the remote operator RE cannot directly visually observe the imaging device 2 in the imaging device bay 3 (hence optionally providing a video feed or screen-sharing process as described further herein).

The image acquisition device 2 can be a Magnetic Resonance (MR) image acquisition device, a Computed Tomography (CT) image acquisition device; a positron emission tomography (PET) image acquisition device; a single photon emission computed tomography (SPECT) image acquisition device; an X-ray image acquisition device; an ultrasound (US) image acquisition device; or a medical imaging device of another modality. The imaging device 2 may also be a hybrid medical imaging device such as a PET/CT or SPECT/CT imaging system. While a single image acquisition device 2 is shown by way of illustration in FIG. 1, more typically a medical imaging laboratory will have multiple image acquisition devices, which may be of the same and/or different imaging modalities. For example, if a hospital performs many CT imaging examinations and relatively fewer MRI examinations and still fewer PET examinations, then the hospital's imaging laboratory (sometimes called the "radiology lab" or some other similar nomenclature) may have three CT scanners, two MRI scanners, and only a single PET scanner. This is merely an example. Moreover, the remote service center 4 may provide service to multiple hospitals, and a single remote expert RE may concurrently monitor and provide assistance (when required) for multiple imaging bays being operated by multiple local operators, only one of which local operator is shown by way of representative illustration in FIG. 1. The local operator controls the medical imaging device 2 via an imaging device controller 10. The remote operator is stationed at a remote workstation 12 (or, more generally, an electronic controller 12).

As used herein, the term "medical imaging device bay" (and variants thereof) refer to a room containing the medical imaging device 2 and also any adjacent control room containing the medical imaging device controller 10 for controlling the medical imaging device. For example, in reference to an MRI device, the medical imaging device bay 3 can include the radiofrequency (RF) shielded room containing the MM device 2, as well as an adjacent control room housing the medical imaging device controller 10, as understood in the art of MRI devices and procedures. On the other hand, for other imaging modalities such as CT, the imaging device controller 10 may be located in the same room as the imaging device 2, so that there is no adjacent control room and the medical bay 3 is only the room containing the medical imaging device 2. In addition, while FIG. 1 shows a single medical imaging device bay 3, it will be appreciated that the remote service center 4 (and more particularly the remote workstation 12) is in communication with multiple medical bays via a communication link 14, which typically comprises the Internet augmented by local area networks at the remote operator RE and local operator LO ends for electronic data communications.

A screen mirroring data stream 18 is generated by a screen sharing or capture device 13, and is sent from the imaging device controller 10 to the remote workstation 12. The screen mirroring data stream 18 is provided by a screen sharing or capture device 13, which in some embodiments is a DVI splitter, a HDMI splitter, and so forth that provides a split of the DVI feed from the medical imaging device controller 10 to an external display monitor of the medical imaging device controller 10. In other embodiments, the live video feed 17 may be provided by a video cable connecting an auxiliary video output (e.g., aux vid out) port of the imaging device controller 10 to the remote workstation 12 of the operated by the remote expert RE. In yet other embodiments, the screen sharing or capture device 13 is embodied by the medical imaging device controller 10 itself running screen-sharing software. The screen mirroring data stream 18 is sent to the remote workstation 12 via the communication link 14 (e.g., as a streaming video feed received via a secure Internet link).

As diagrammatically shown in FIG. 1, in some embodiments, a camera 16 (e.g., a video camera) is arranged to acquire a video stream 17 of a portion of the medical imaging device bay 3 that includes at least the area of the imaging device 2 where the local operator LO interacts with the patient, and optionally may further include the imaging device controller 10. The video stream 17 is also sent to the remote workstation 12 via the communication link 14 (e.g., as a streaming video feed received via a secure Internet link).

The communication link 14 also provides a natural language communication pathway 19 for verbal and/or textual communication between the local operator and the remote operator. For example, the natural language communication link 19 may be a Voice-Over-Internet-Protocol (VOIP) telephonic connection, an online video chat link, a computerized instant messaging service, or so forth. Alternatively, the natural language communication pathway 19 may be provided by a dedicated communication link that is separate from the communication link 14 providing the data communications 17, 18 (e.g., the natural language communication pathway 19 may be provided via a landline telephone). In another example, the natural language communication pathway 19 may be provided via an ROCC device 9, such as a mobile device (e.g., a tablet computer or a smartphone). For example, an "app" can run on the ROCC device 9 (operable by the local operator LO) and the remote workstation 12 (operable by the remote expert RE) to allow communication (e.g., audio chats, video chats, and so forth) between the local operator and the remote expert.

In some embodiments, one or more sensors 8 can additionally or alternatively be disposed in the medical imaging bay 3. The sensor(s) 8 are configured to collect data related to the events corresponding to the movement of the patient or medical personnel, in addition to the number of people, in the medical imaging bay 3. In one particular example, the sensor(s) 8 can include a radar sensor configured to detect persons in the medical imaging bay 3 containing the medical imaging device 2. The radar sensor could be in addition to, or in place of, the video camera 16. Other types of sensors such as vital sign sensors monitoring patient vital signs (e.g., heart rate, respiratory rate, $SpO_2$, et cetera) may also be provided.

FIG. 1 also shows, in the remote service center 4 including the remote workstation 12, such as an electronic processing device, a workstation computer, or more generally a computer, which is operatively connected to receive and present the video 17 of the medical imaging device bay 3 from the camera 16 and to present the screen mirroring data stream 18 as a mirrored screen from the screen capture device 13. Additionally or alternatively, the remote workstation 12 can be embodied as a server computer or a plurality of server computers, e.g., interconnected to form a server cluster, cloud computing resource, or so forth. The workstation 12 includes typical components, such as an electronic processor 20 (e.g., a microprocessor), at least one user input device (e.g., a mouse, a keyboard, a trackball, and/or the like) 22, and at least one display device 24 (e.g., an LCD display, plasma display, cathode ray tube display, and/or so forth). In some embodiments, the display device 24 can be a separate component from the workstation 12. The display device 24 may also comprise two or more display devices, e.g., one display presenting the video 17 and the other display presenting the shared screen of the imaging device controller 10 generated from the screen mirroring data stream 18. Alternatively, the video and the shared screen may be presented on a single display in respective windows. The electronic processor 20 is operatively connected with a one or more non-transitory storage media 26. The non-transitory storage media 26 may, by way of non-limiting illustrative example, include one or more of a magnetic disk, RAID, or other magnetic storage medium; a solid-state drive, flash drive, electronically erasable read-only memory (EEROM) or other electronic memory; an optical disk or other optical storage; various combinations thereof; or so forth; and may be for example a network storage, an internal hard drive of the workstation 12, various combinations thereof, or so forth. It is to be understood that any reference to a non-transitory medium or media 26 herein is to be broadly construed as encompassing a single medium or multiple media of the same or different types. Likewise, the electronic processor 20 may be embodied as a single electronic processor or as two or more electronic processors. The non-transitory storage media 26 stores instructions executable by the at least one electronic processor 20. The instructions include instructions to generate a graphical user interface (GUI) 28 for display on the remote operator display device 24.

The medical imaging device controller 10 in the medical imaging device bay 3 also includes similar components as the remote workstation 12 disposed in the remote service center 4. Except as otherwise indicated herein, features of the medical imaging device controller 10, which includes a local workstation 12', disposed in the medical imaging device bay 3 similar to those of the remote workstation 12 disposed in the remote service center 4 have a common reference number followed by a "prime" symbol, and the description of the components of the medical imaging device controller 10 will not be repeated. In particular, the medical imaging device controller 10 is configured to display a GUI 28' on a display device or controller display 24' that presents information pertaining to the control of the medical imaging device 2, such as configuration displays for adjusting configuration settings an alert 30 perceptible at the remote location when the status information on the medical imaging examination satisfies an alert criterion of the imaging device 2, imaging acquisition monitoring information, presentation of acquired medical images, and so forth. It will be appreciated that the screen mirroring data stream 18 carries the content presented on the display device 24' of the medical imaging device controller 10. The communication link 14 allows for screen sharing between the display device 24 in the remote service center 4 and the display device 24' in the medical imaging device bay 3. The GUI 28' includes one or more dialog screens, including, for example, an examination/scan selection dialog screen, a scan settings dialog screen, an acquisition monitoring dialog screen, among others. The GUI 28' can be included in the video feed 17 or the mirroring data stream 18 and displayed on the remote workstation display 24 at the remote location 4.

FIG. 1 shows an illustrative local operator LO, and an illustrative remote expert RE (i.e., expert, e.g., supertech). However, in a Radiology Operations Command Center (ROCC) as contemplated herein, the ROCC provides a staff of supertechs who are available to assist local operators LO at different hospitals, radiology labs, or the like. The ROCC may be housed in a single physical location, or may be geographically distributed. For example, in one contemplated implementation, the remote operators RO are recruited from across the United States and/or internationally in order to provide a staff of supertechs with a wide range of expertise in various imaging modalities and in various imaging procedures targeting various imaged anatomies. In view of this multiplicity of local operators LO and multiplicity of remote operators RO, the disclosed communication link 14 includes a server computer 14s (or a cluster of servers, cloud computing resource comprising servers, or so forth) which is programmed to establish connections between selected local operator LO/remote expert RE. For example, if the server computer 14s is Internet-based, then connecting a specific selected local operator LO/remote expert RE can be done using Internet Protocol (IP) addresses of the various components 16, 10, 12, 8, 9, the telephonic or video terminals of the natural language communication pathway 19, etc. The server computer 14s is operatively connected with a one or more non-transitory storage media 26s. The non-transitory storage media 26s may, by way of non-limiting illustrative example, include one or more of a magnetic disk, RAID, or other magnetic storage medium; a solid state drive, flash drive, electronically erasable read-only memory (EEROM) or other electronic memory; an optical disk or other optical storage; various combinations thereof; or so forth; and may be for example a network storage, an internal hard drive of the server computer 14s, various combinations thereof, or so forth. It is to be understood that any reference to a non-transitory medium or media 26s herein is to be broadly construed as encompassing a single medium or multiple media of the same or different types. Likewise, the server computer 14s may be embodied as a single electronic processor or as two or more electronic processors. The non-transitory storage media 26s stores instructions executable by the server computer 14s. In addition, the non-transitory computer readable medium 26s (or another database) stores data related to a set of remote experts RE and/or a set of local operators LO. The remote expert data can include, for example, skill set data, work experience data, data related to ability to work on multi-vendor modalities, data related to experience with the local operator LO and so forth. Moreover, the server computer 14s can in communication with one or more patient databases 31, including for example, a radiology information system (RIS) database, a Picture Archiving and Communication System (PACS) database, an electronic health record (EHR) database, an electronic medical record (EMR) database, and so forth.

Furthermore, as disclosed herein the server 14s performs a method or process 100 of providing remote monitoring of a local operator LO of the medical imaging device 2 during a medical imaging examination. The non-transitory computer readable medium 26s of the server computer 14s can store instructions executable by the server computer to perform the method 100 of providing remote monitoring of the local operator LO of the medical imaging device 2 during a medical imaging examination.

Figure 2:
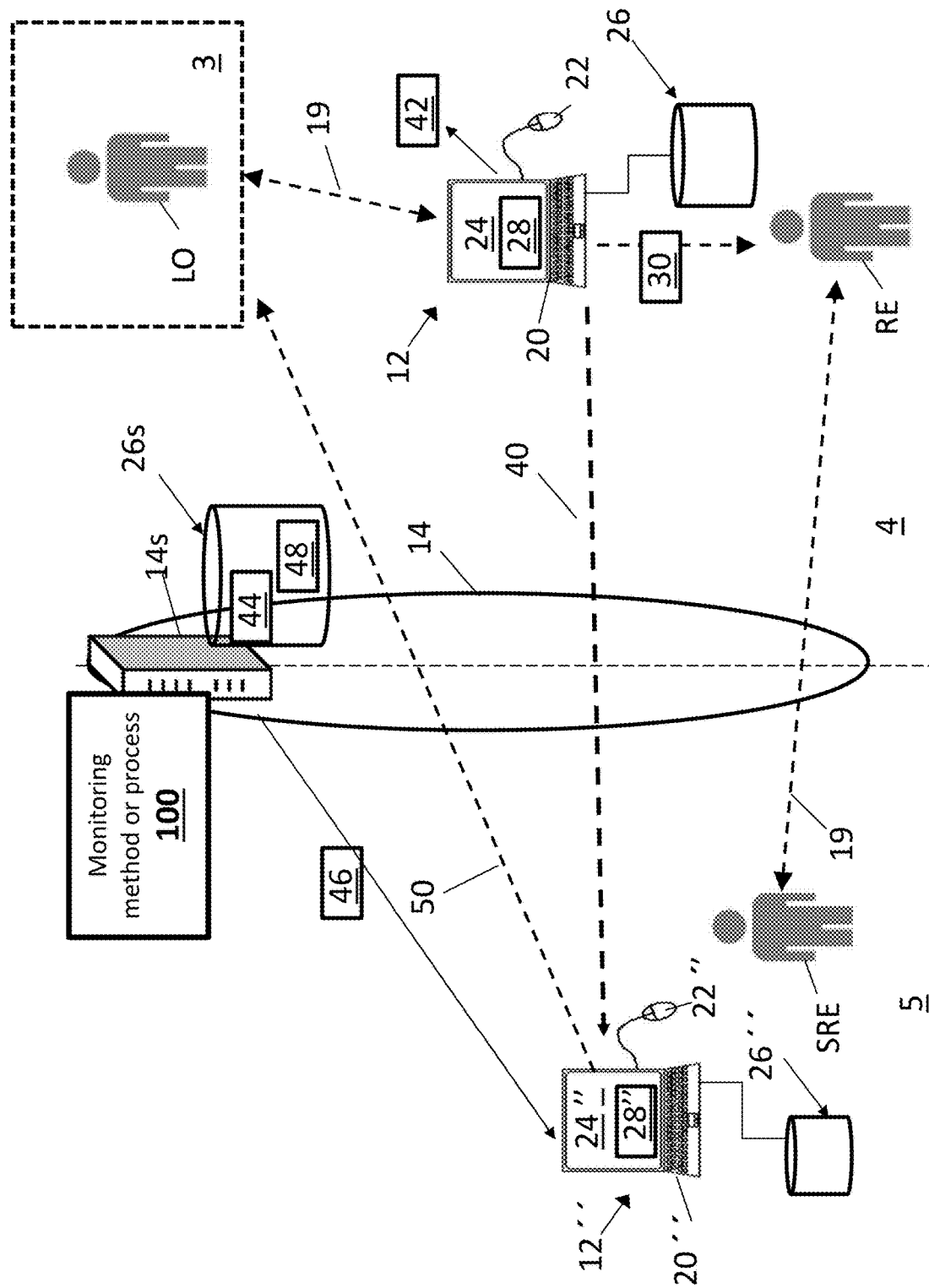
FIG. 2 shows another view of the apparatus of FIG. 1.

The method 100 also includes operations to implement a seamless handoff 40 of assistance of the medical imaging examination between the remote expert RE and another or second remote expert (denoted in FIG. 1 as SRE) disposed in a second remote service center 5. FIG. 2 diagrammatically shows an interaction between the remote expert RE and the second remote expert SRE. The second remote expert SRE also uses a remote workstation 12". Except as otherwise indicated herein, features of the remote workstation 12" that are similar to those of the remote workstation 12 disposed in the remote service center 4 have a common reference number followed by a "double prime" symbol, and the description of the components of the remote workstation 12" will not be repeated.

Figure 3:
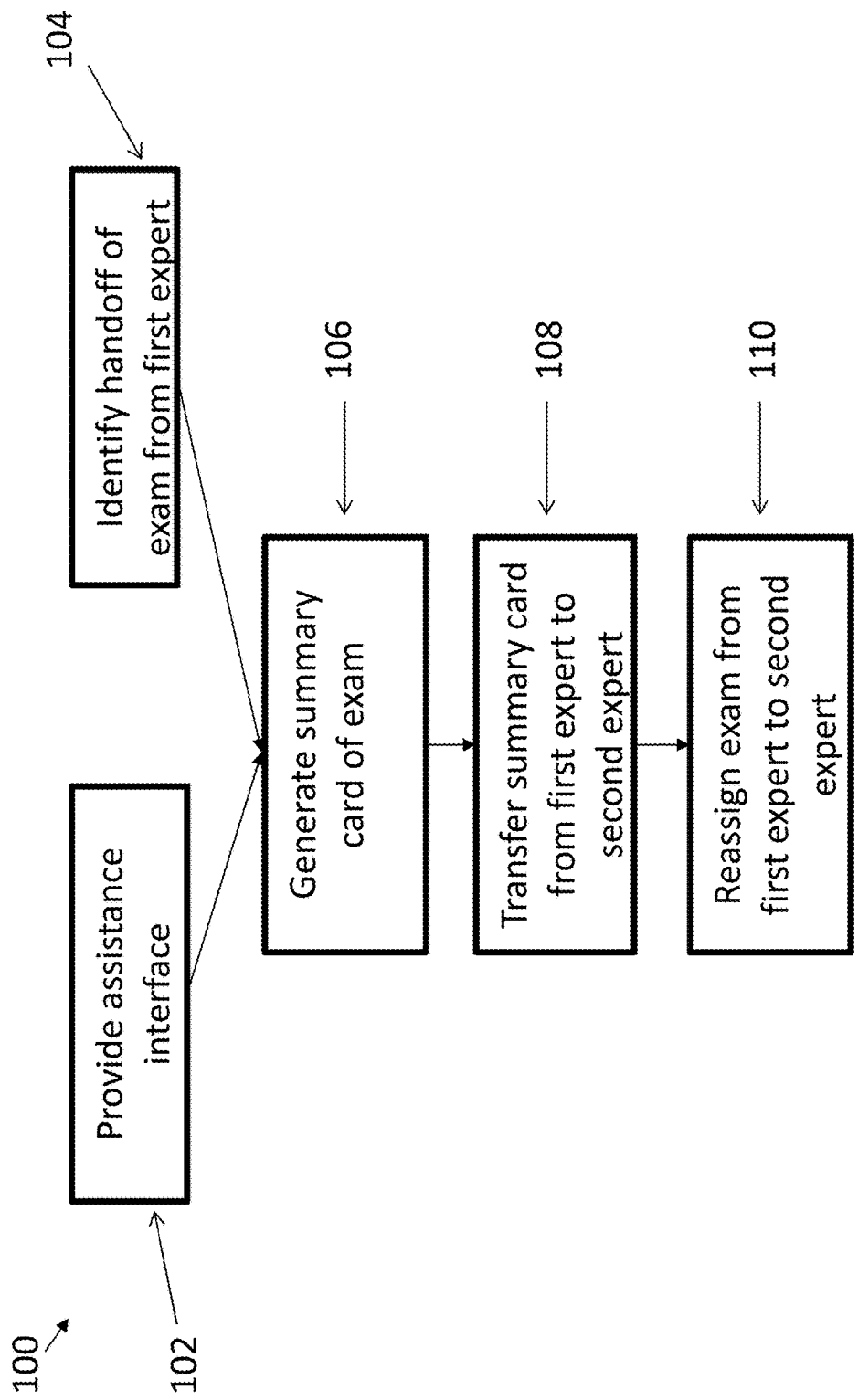
FIG. 3 shows an example flow chart of operations suitably performed by the apparatus of FIG. 1.

With reference to FIG. 3, and with continuing reference to FIGS. 1 and 2, an illustrative embodiment of the monitoring method 100 is diagrammatically shown as a flowchart. To begin the monitoring method 100, at an operation 102, a remote assistance interface is provided via the GUI 28 of the remote workstation 12, and the GUI 28' of the local workstation 12'. Via the remote assistance interface, the local operator LO can receive remote assistance from the remote expert RE during a medical imaging examination performed by the local operator using a medical imaging device 2.

At some point during the imaging examination (or before the imaging examination even begins), the remote expert RE may decide to hand off the examination to another remote expert, such as the second remote expert SRE, for a variety of reasons (e.g., the remote expert RE is too busy, is about to end a work shift, does not have appropriate expertise to assist the local operator LO, and so forth). At an operation 104, prior to or during the medical imaging examination, a handoff (indicated by an arrow and reference character 40 is in FIG. 2) from the remote expert RE to the second remote expert SRE is identified.

To perform the handoff 40, the GUI 28 on the display device 24 of the remote workstation 12 can include a transfer icon 42 (shown only in FIG. 2) selectable by the remote expert RE to initiate the identifying of the handoff 40 (e.g., via the at least one user input device 22, including a mouse click, a keyboard stroke, and the like). The transfer icon 42 may be suitably labeled to indicate its purpose, for example with a textual label such as "Pass the Exam" or the like, and/or an equivalent symbolic representation such as a graphic showing an arrow pointing to an icon representing another remote expert. In a situation in which there are several examinations assigned to the remote expert RE, each examination may have a corresponding transfer icon, so as to enable the remote expert RE to selectively initiate handoff of a specific examination.

Once the transfer icon 42 is selected, the second remote expert SRE can be identified. In one example, the transfer icon 42 can indicate that the handoff 40 is to go to a particular second remote expert SRE (e.g., the first remote expert RE requests that the handoff 40 go to a particular remote expert—the second remote expert SRE). In another example, a list 44 of available remote experts is stored in the non-transitory computer readable medium 26s of the server computer 14s. Responsive to the selection of the transfer icon 42 by the first remote expert RE, a dialog is provided on the GUI 28 of the remote workstation 12 via which the first remote expert RE selects the second remote expert SRE from the list 44 of available remote experts. In some embodiments, the SRE can provide an input (via the at least one user input device 22" of the remote workstation 12") indicative of an acceptance of the selection made by the first remote expert RE as the remote expert to receive the handoff 40.

In other embodiments, the server computer 14s can detect a loss of connectivity between the local operator LO and the first remote expert RE (e.g., a loss of connectivity of the remote assistance interface on the respective GUIs 28, 28'). Upon detection of the loss of connectivity, the server computer 14s can automatically select an available remote expert (e.g., the second remote expert SRE) from the list 44 of available remote experts. Optionally, once the second remote expert SRE is selected, a communication pathway 19' (e.g., telephonic, chat box, video call, etc.) can be established between the first remote expert RE and the second remote expert SRE during (or after) the handoff 40, via which the first remote expert RE can brief the second remote expert SRE directly on the examination and the status of the examination (if it is in-progress).

However, in the case of a loss of connectivity in which the first remote expert RE is no longer connected to the server computer 14s at all, the communication pathway 19' is not capable of being established and hence this operation is omitted. Likewise, if the first remote expert RE is busy handling another examination (for example, in a scenario in which the first remote expert RE receives two overlapping calls for assistance which leads the first remote expert RE to manually initiate the handoff) then the communication pathway 19' is optionally omitted. Advantageously, in such cases the operation 106 described next provides for automated transfer to the second remote expert SRE of information about the medical imaging examination being handed off. Even if the communication pathway 19' is provided, the automated information transfer to the second remote expert SRE can be beneficial as the first remote expert RE might fail to communicate some important information via the communication pathway 19'.

At an operation 106, a representation 46 containing information about the medical imaging examination being handed off can be generated. The representation 46 can be referred to as a summary card 46. To generate the summary card 46, information about the medical imaging examination can be retrieved from at least one data source (indicated generally as reference character 48 in FIGS. 1 and 2). The data source(s) can include, for example, a pre-examination screening form, data mined from an image of the controller display 24' of the device controller 10 of a medical imaging device 2 used in the medical imaging examination, copies or transcripts of communication between the local operator LO and the first remote expert RE generated by the remote assistance interface 28, 28', patient data retrieved from a the patient database 31, such as a RIS database or an EM) database, and transcripts of communication between the local operator LO and medical staff members at a medical facility where the medical imaging examination is taking place (e.g., a "huddle session"). In some examples, the data source(s) 48 that include text (e.g., copies or transcripts of communication between the local operator LO and the remote expert RE, or copies or transcripts of one or more huddle sessions, and so forth), natural language processing (NLP) can be performed on the text of these data source 48 to generate the summary card 46. The summary card 46 can include one or more of an imaging protocol, one or more patient complications, one or more sources of image arti-facts, hardware issues of the imaging device 2, suggestions on how to proceed during the examination, and so forth.

At an operation 108, the summary card 46 is transferred to the second remote expert SRE from the server computer 14s. At an operation 110, the medical imaging examination is reassigned from the first remote expert RE to the second remote expert SRE (shown generally in FIG. 2 with an arrow 50).

The disclosure has been described with reference to the preferred embodiments. Modifications and alterations may occur to others upon reading and understanding the preceding detailed description. It is intended that the exemplary embodiment be construed as including all such modifications and alterations insofar as they come within the scope of the appended claims or the equivalents thereof.

The invention claimed is:

1. A system, comprising:
    at least one electronic processor configured for communication with an imaging device controller and a first remote electronic processing device, wherein the imaging device controller is configured to control a medical imaging device disposed in a medical imaging device bay and is operable by a local operator, and wherein first remote electronic processing device is disposed in a first remote service center that is remote from the medical imaging device bay and is operable by a first remote expert; and
    a non-transitory computer readable medium storing instructions executable by the at least one electronic processor to perform a remote assistance method comprising:
    providing a remote assistance interface via which a local operator receives remote assistance about operating the medical imaging device from the first remote expert during a medical imaging examination performed by the local operator using the medical imaging device, the remote assistance interface including:
        a natural language communication pathway between the local operator and the first remote expert, and
        a video feed showing the imaging device controller of the medical imaging device provided to the first remote electronic processing device operable by the first remote expert;
    prior to or during the medical imaging examination, identifying a handoff from a first remote expert assigned to provide the remote assistance during the medical imaging examination to a second remote expert, wherein the identifying of the handoff includes:
        detecting a loss of connectivity between the remote assistance interface and the first remote expert;
        upon detection of the loss of connectivity, automatically selecting the second remote expert; and
        sending an automated notification of a handoff request to the second remote expert to establish a communication connection between the imaging device controller and a second remote electronic processing device, wherein the second remote electronic processing device is remote from the medical imaging device bay and the first remote service center and is operable by the second remote expert;
    generating a representation containing information about the medical imaging examination by retrieving the information about the medical imaging examination from at least one data source, the representation including at least an imaging protocol, one or more patient complications, one or more sources of image artifacts, hardware issues of the imaging device used during the medical examination, and suggestions on how to proceed during the examination;
reassigning the medical imaging examination from the first remote expert to the second remote expert including updating the remote assistance interface so that the natural language communication pathway is between the local operator and the second remote expert, and wherein the video feed showing the imaging device controller of the medical imaging device is provided to the second remote expert via the second remote electronic processing device; and
transferring the representation containing information about the medical imaging examination to the second remote expert and displaying the representation on the second remote processing device of the second remote expert.

2. The system of claim 1, wherein the remote assistance method further includes:
providing, on a display device of a remote workstation operable by the first remote expert, a graphical user interface including a transfer icon selectable to initiate a manual handoff.

3. The system of claim 1, wherein the remote assistance method further comprises:
during or after identifying the handoff, establishing a communication pathway between the first remote expert and the second remote expert.

4. The system of claim 1, wherein the remote assistance method further includes:
receiving, from the second remote expert, an input indicative of an acceptance of the automatic selection.

5. The system of claim 1, wherein the remote assistance method further includes:
maintaining a list of available remote experts, wherein the second remote expert is selected from the list of available remote experts.

6. The system of claim 1, wherein the at least one data source comprises one or more of:
a pre-examination screening form;
data mined from an image of a controller display of the imaging device controller of the medical imaging device used in the medical imaging examination;
copies or transcripts of communication between the local operator and the first remote expert that are generated by the remote assistance interface;
patient data retrieved from a radiology information system database or an electronic medical record database; and
transcripts of communication between the local operator, and medical staff members at a medical facility where the medical imaging examination is taking place.

7. The system of claim 6, wherein the at least one data source comprises (i) the copies or transcripts of communication between the local operator and the first remote expert that are generated by the remote assistance interface or (ii) the transcripts of communication between the local operator, and medical staff members at a medical facility where the medical imaging examination is taking place, and the method further includes:
performing natural language processing on text in the transcripts to generate processed text; and
generating the representation using the processed text.

8. A non-transitory computer readable medium storing instructions executable by at least one electronic processor to perform a remote assistance method comprising:
providing a remote assistance interface via which a local operator receives remote assistance about operating a medical imaging device during a medical imaging examination performed by the local operator using the medical imaging device disposed in a medical imaging device bay, the remote assistance interface including:
a natural language communication pathway between the local operator and a first remote expert assigned to provide the remote assistance during the medical imaging examination and
a video feed showing an imaging device controller of the medical imaging device provided to a first remote electronic processing device, wherein first remote electronic processing device is disposed in a first remote service center that is remote from the medical imaging device bay and is operable by the first remote expert;
prior to or during the medical imaging examination, identifying a handoff from the first remote expert to a second remote expert disposed in a second remote service center that is remote from the medical imaging device bay and the first remote service center, wherein the identifying of the handoff includes:
detecting a loss of connectivity between the remote assistance interface and the first remote expert;
upon detection of the loss of connectivity, automatically selecting the second remote expert; and
sending an automated notification of a handoff request to the second remote expert to establish a communication connection between the imaging device controller and a second remote electronic processing device, wherein the second remote electronic processing device is remote from the medical imaging device bay and the first remote service center and is operable by the second remote expert;
generating a representation containing information about the medical imaging examination by retrieving the information about the medical imaging examination from at least one data source, the representation including at least an imaging protocol, one or more patient complications, one or more sources of image artifacts, hardware issues of the imaging device used during the medical examination, and suggestions on how to proceed during the examination;
reassigning the medical imaging examination from the first remote expert to the second remote expert including updating the remote assistance interface so that the natural language communication pathway is between the local operator and the second remote expert, and wherein the video feed showing the imaging device controller of the medical imaging device is provided to the second remote expert via the second remote electronic processing device; and
transferring the representation containing information about the medical imaging examination to the second remote expert and displaying the representation on the second remote processing device of the second remote expert.

9. The non-transitory computer readable medium of claim 8, wherein the at least one data source comprises one or more of:
a pre-examination screening form;
data mined from an image of a controller display of the imaging device controller of the medical imaging device used in the medical imaging examination;
copies or transcripts of communication between the local operator and the first remote expert that are generated by the remote assistance interface;

patient data retrieved from a radiology information system database or an electronic medical record database; and transcripts of communication between the local operator, and medical staff members at a medical facility where the medical imaging examination is taking place.

10. The non-transitory computer readable medium of claim 9, wherein the at least one data source comprises (i) the copies or transcripts of communication between the local operator and the first remote expert that are generated by the remote assistance interface or (ii) the transcripts of communication between the local operator, and medical staff members at a medical facility where the medical imaging examination is taking place, and the method further includes:

performing natural language processing on text in the transcripts to generate processed text; and generating the representation using the processed text.

11. The non-transitory computer readable medium of claim 8, wherein the remote assistance method further includes:

providing, on a display device of a remote workstation operable by the first remote expert, a graphical user interface including a transfer icon selectable to initiate a manual handoff.

12. The non-transitory computer readable medium of claim 8, wherein the remote assistance method further comprises:

during or after identifying the handoff, establishing a communication pathway between the first remote expert and the second remote expert.

13. The non-transitory computer readable medium of claim 8, wherein the remote assistance method further includes:

maintaining a list of available remote experts, wherein the second remote expert is selected from the list of available remote experts.

14. A remote assistance method comprising:

providing a remote assistance interface via which a local operator disposed in a medical imaging device bay receives remote assistance about operating a medical imaging device from a first remote expert disposed in a first remote service center that is remote from the medical imaging device bay and assigned to provide the remote assistance during a medical imaging examination performed by the local operator using the medical imaging device, the remote assistance interface including:

a natural language communication pathway between the local operator and the first remote expert, and a video feed showing an imaging device controller of the medical imaging device provided to a first remote electronic processing device operable by the first remote expert;

prior to or during the medical imaging examination, identifying a handoff from the first remote expert assigned to provide the remote assistance during the medical imaging examination to a second remote expert disposed in a second remote service center that is remote from the medical imaging device bay and the first remote service center, wherein the identifying of the handoff includes:

detecting a loss of connectivity between the remote assistance interface and the first remote expert;

upon detection of the loss of connectivity, automatically selecting the second remote expert; and sending an automated notification of a handoff request to the second remote expert to establish a communication connection between the imaging device controller and a second remote electronic processing device wherein the second remote electronic processing device is remote from the medical imaging device bay and the first remote service center and is operable by the second remote expert;

generating a representation containing information about the medical imaging examination by retrieving the information about the medical imaging examination from at least one data source, the representation including at least an imaging protocol, one or more patient complications, one or more sources of image artifacts, hardware issues of the imaging device, and suggestions on how to proceed during the examination;

reassigning the medical imaging examination from the first remote expert to the second remote expert including updating the remote assistance interface so that the natural language communication pathway is between the local operator and the second remote expert, and wherein the video feed showing the imaging device controller of the medical imaging device is provided to the second remote expert via the second remote electronic processing device; and transferring the representation containing information about the medical imaging examination to the second remote expert and displaying the representation on the second remote processing device of the second remote expert.

15. The remote assistance method of claim 14, further comprising:

acquiring video of the medical imaging examination performed by the local operator using the medical imaging device;

wherein the remote assistance interface further includes a display of the video of the medical imaging examination to the first remote expert; and the updating the remote assistance interface further includes the video of the medical imaging examination being displayed to the second remote expert.

16. The remote assistance method of claim 14, wherein the at least one data source comprises one or more of:

a pre-examination screening form;

data mined from an image of a controller display of a device controller of a medical imaging device used in the medical imaging examination;

copies or transcripts of communication between the local operator and the first remote expert generated by the remote assistance interface;

patient data retrieved from a radiology information system database or an electronic medical record database; and transcripts of communication between the local operator, and medical staff members at a medical facility where the medical imaging examination is taking place.

17. The remote assistance method of claim 14, wherein the remote assistance method further comprises:

during or after identifying the handoff, establishing a communication pathway between the first remote expert and the second remote expert.

* * * * *